June 7, 1960 R. L. SCHOENBERGER, JR 2,939,161
MACHINE FOR FORMING HINGE JOINTS IN CASED BOOKS
Filed July 11, 1958 14 Sheets-Sheet 4
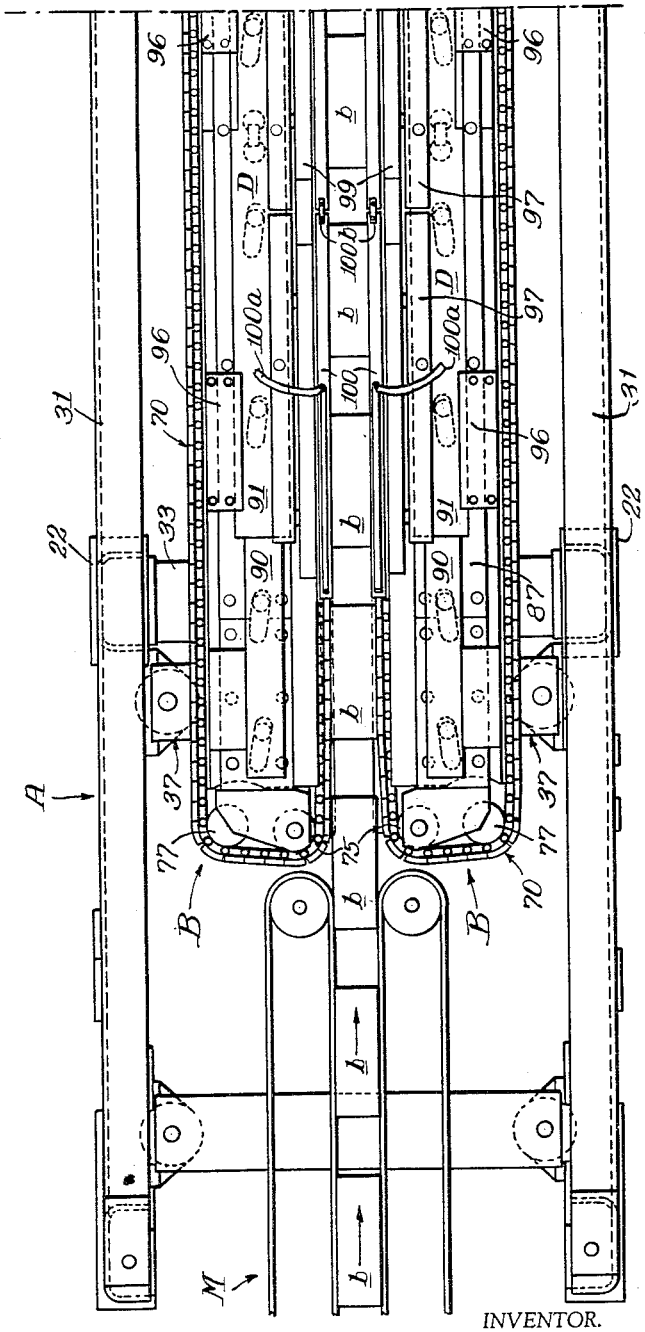
INVENTOR.
Robert L. Schoenberger, Jr,
BY
Schroeder, Hofgren, Brady & Wegner
Atty's.

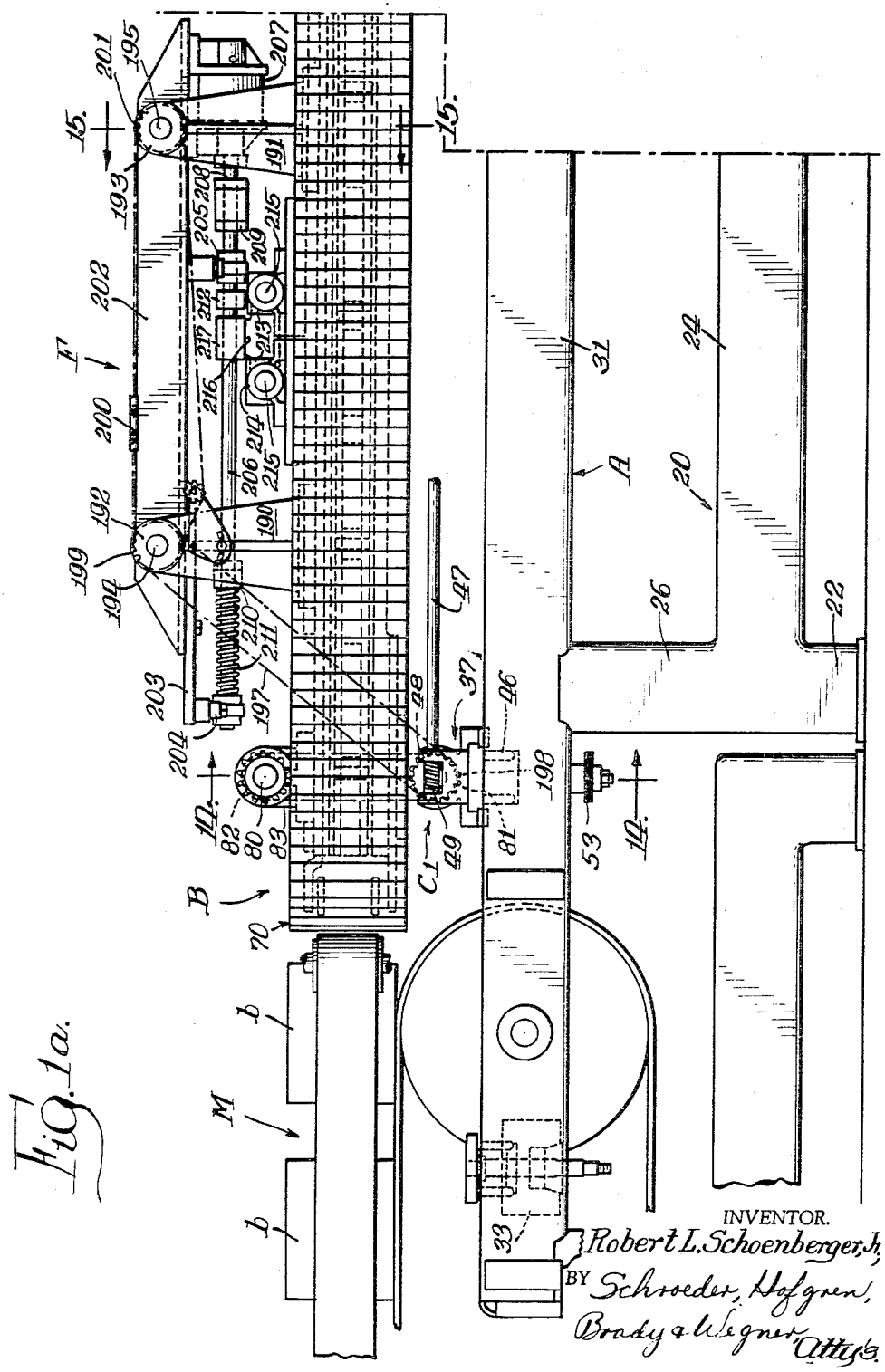

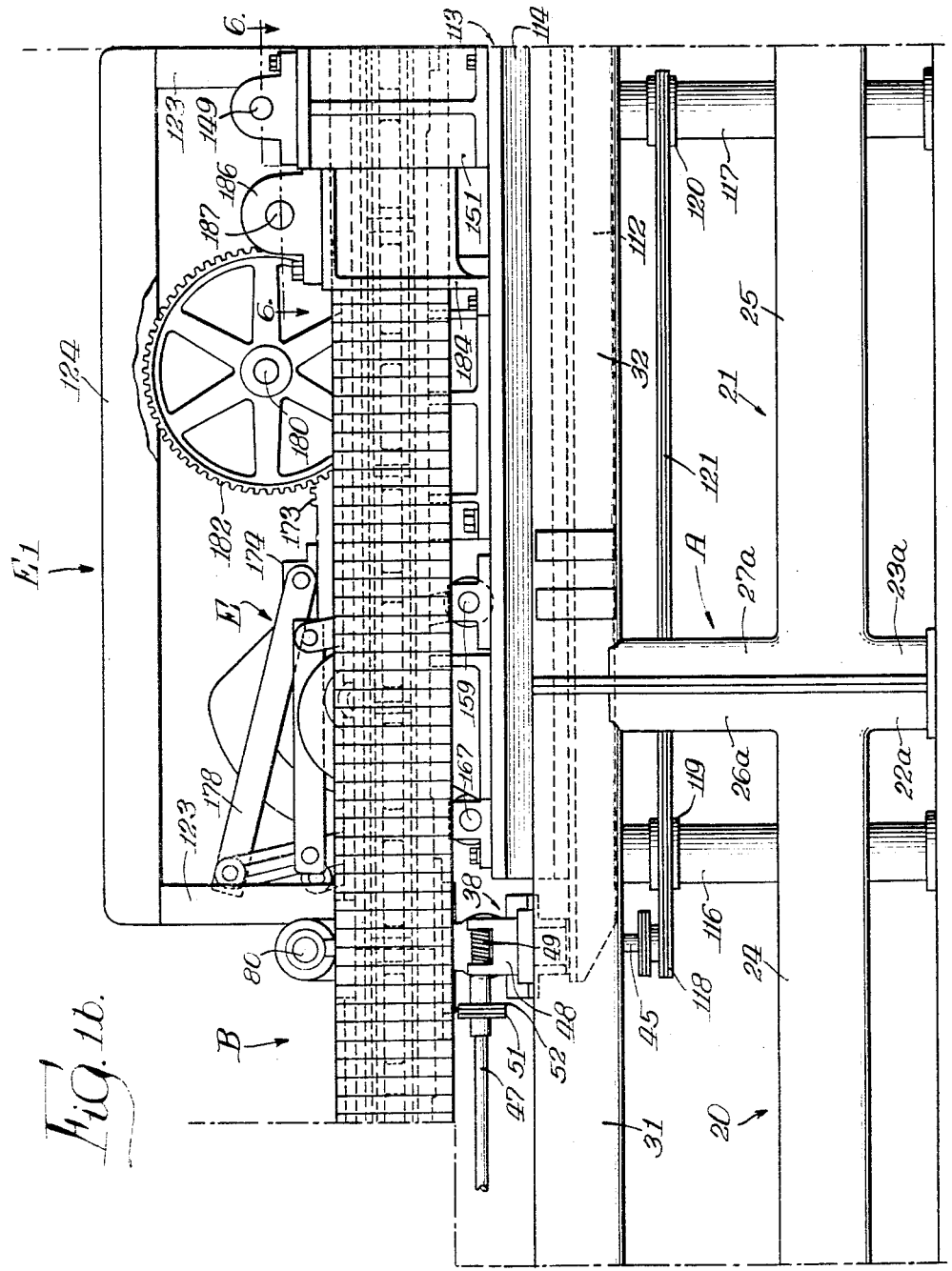

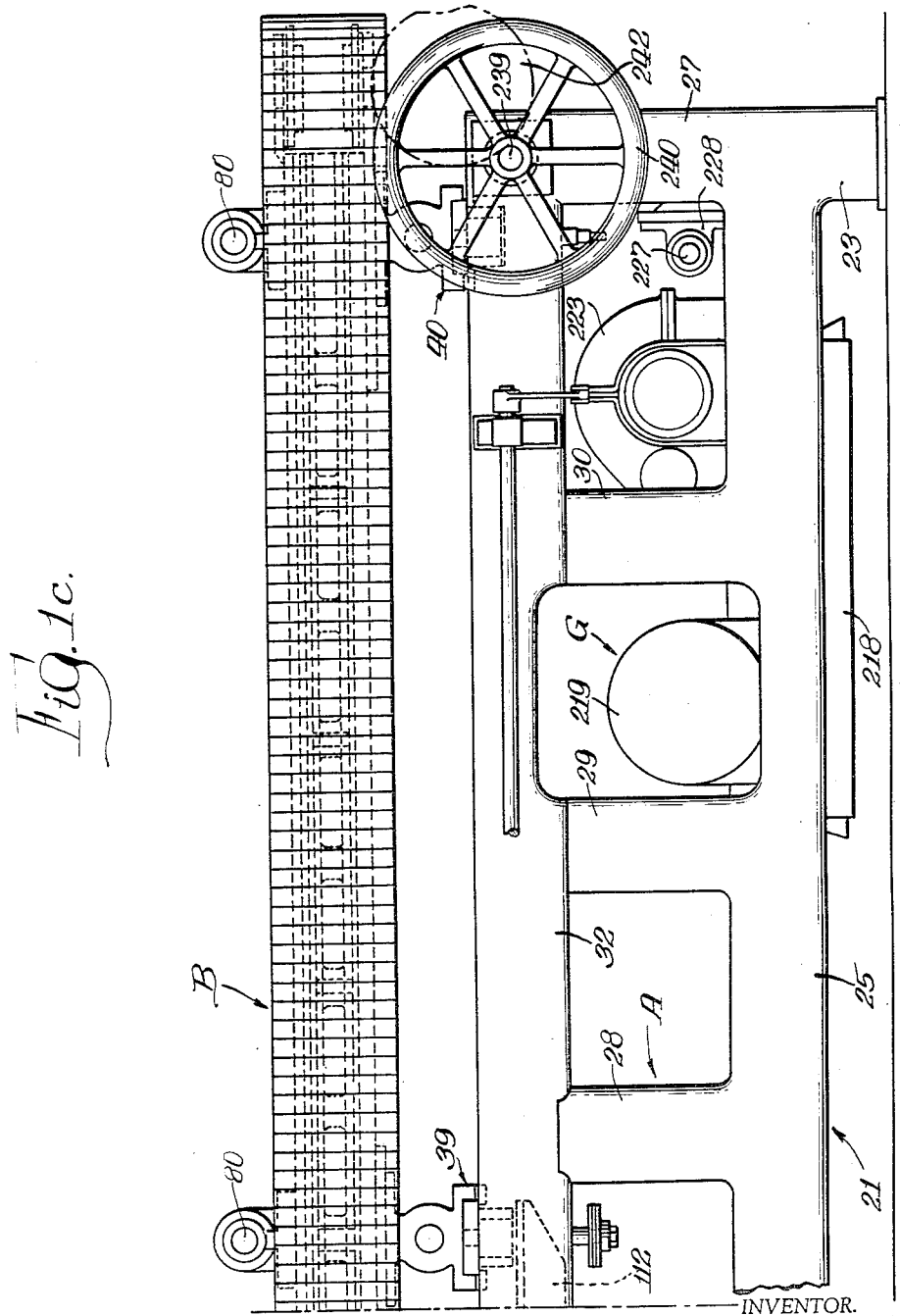

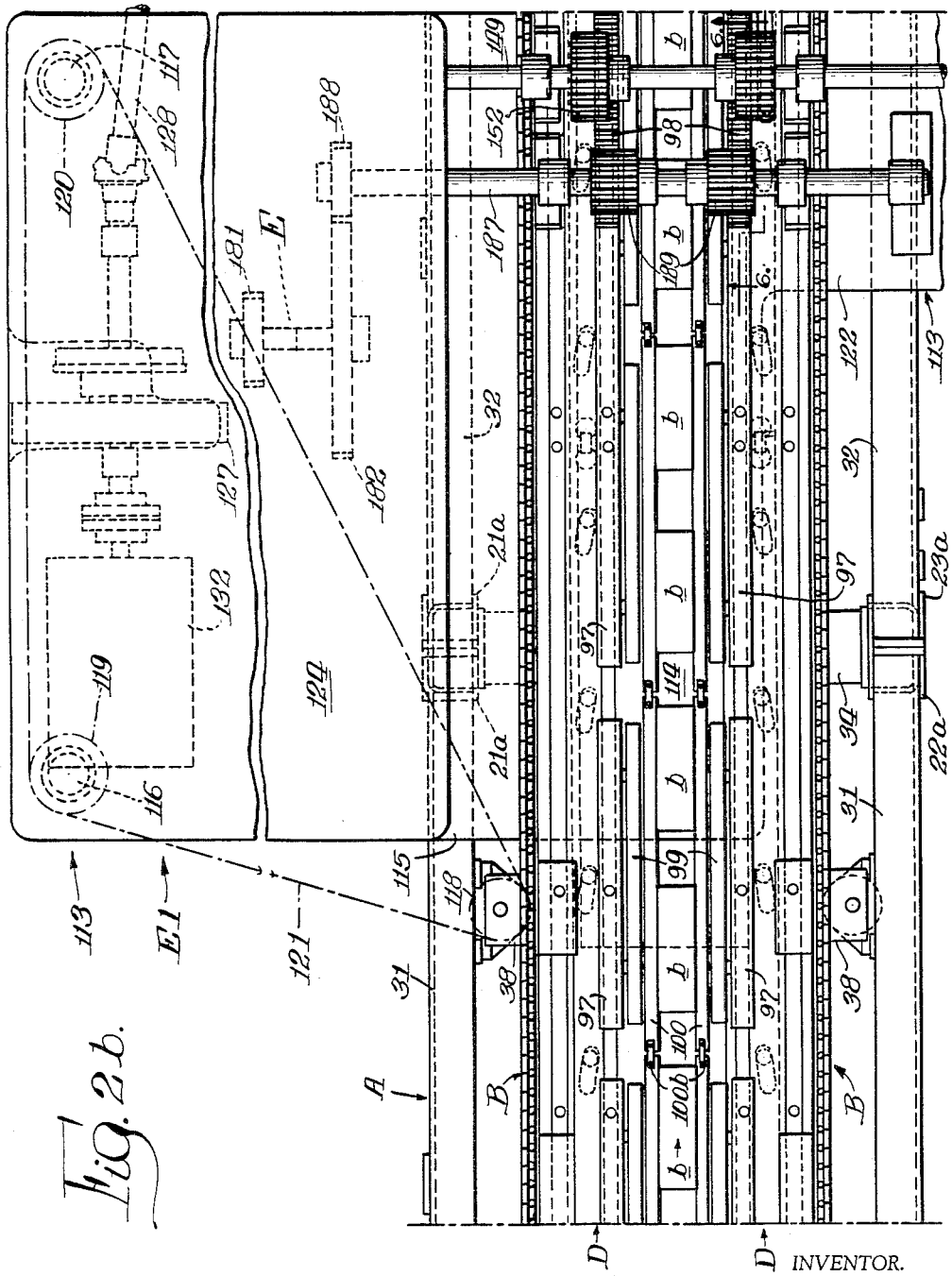

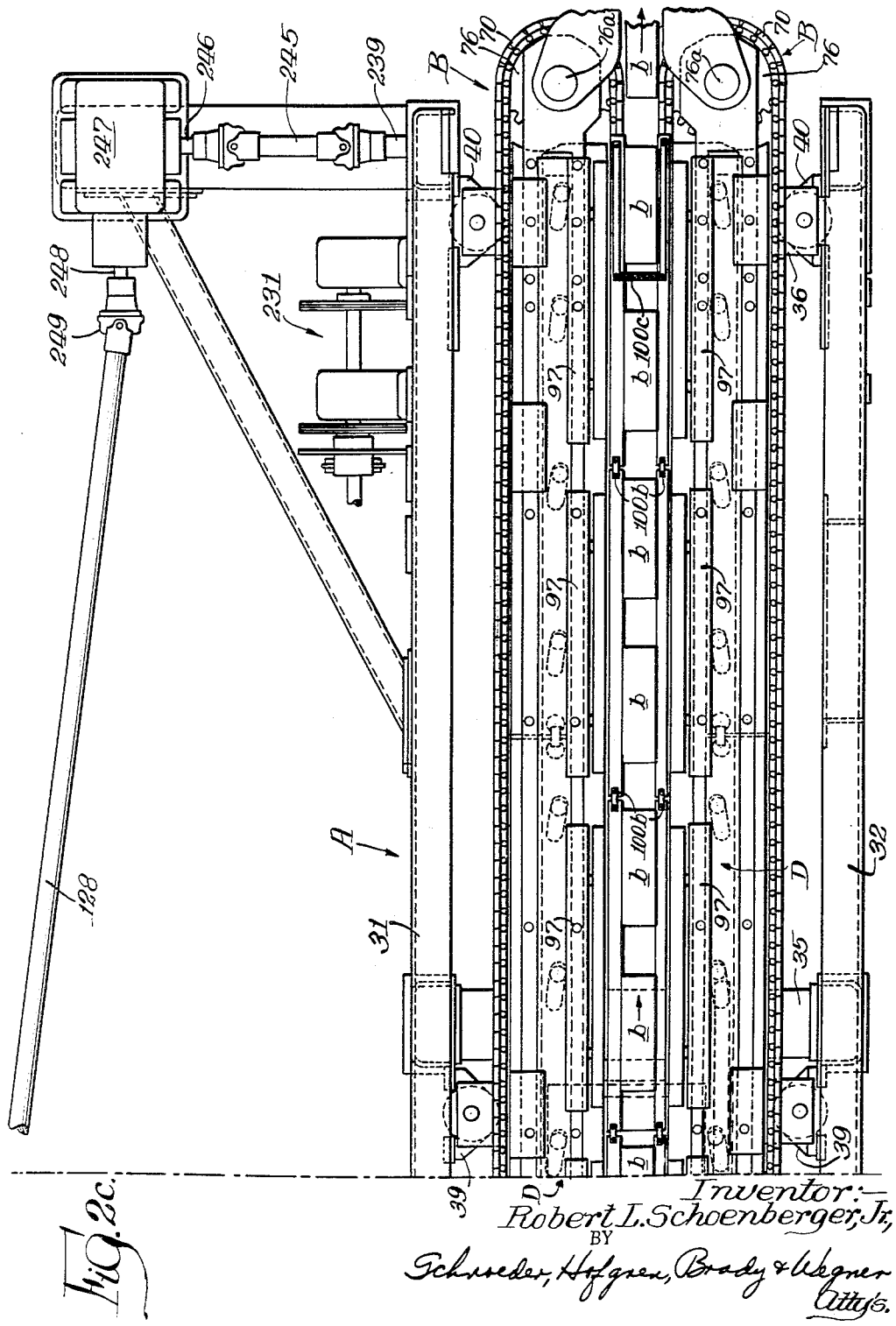

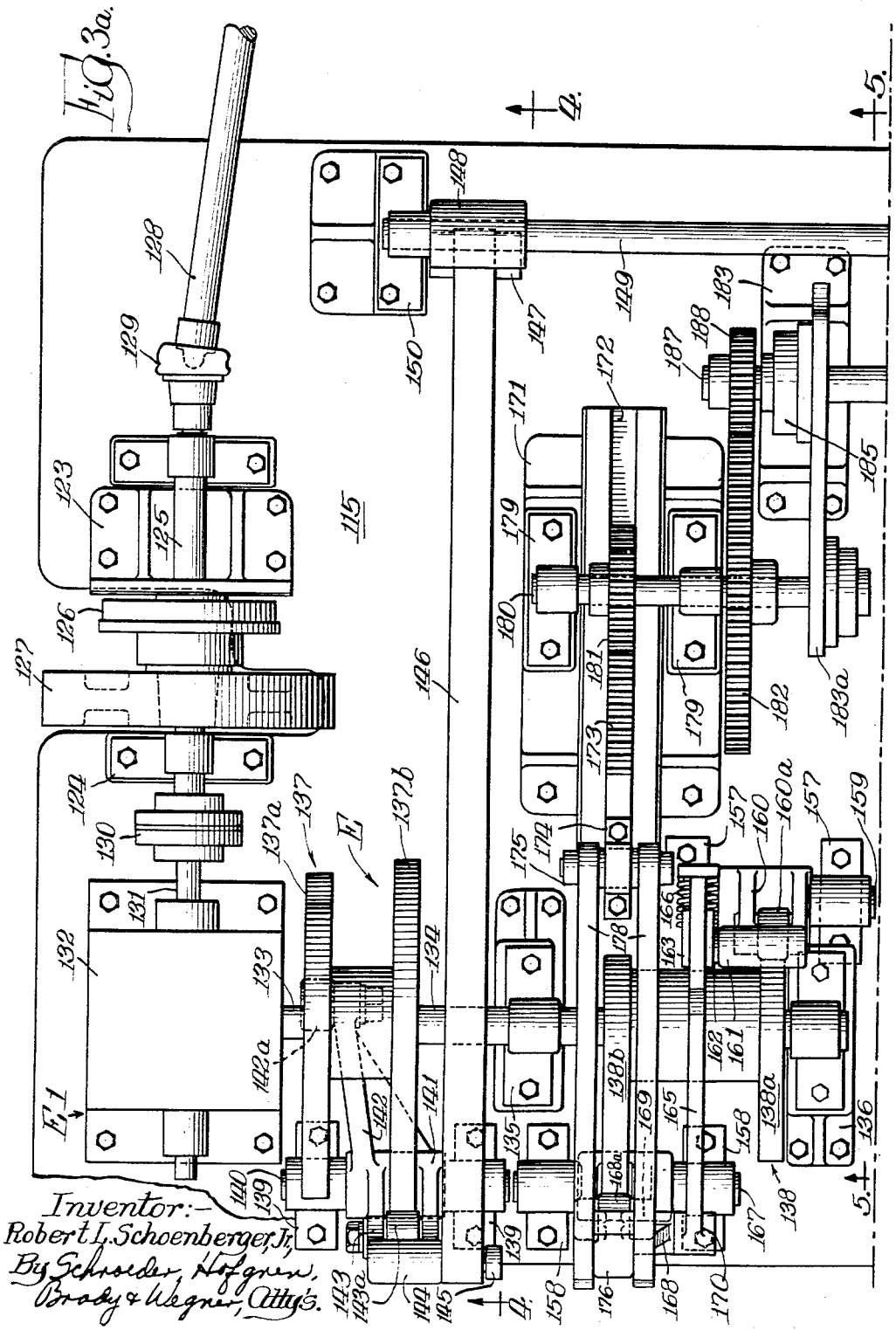

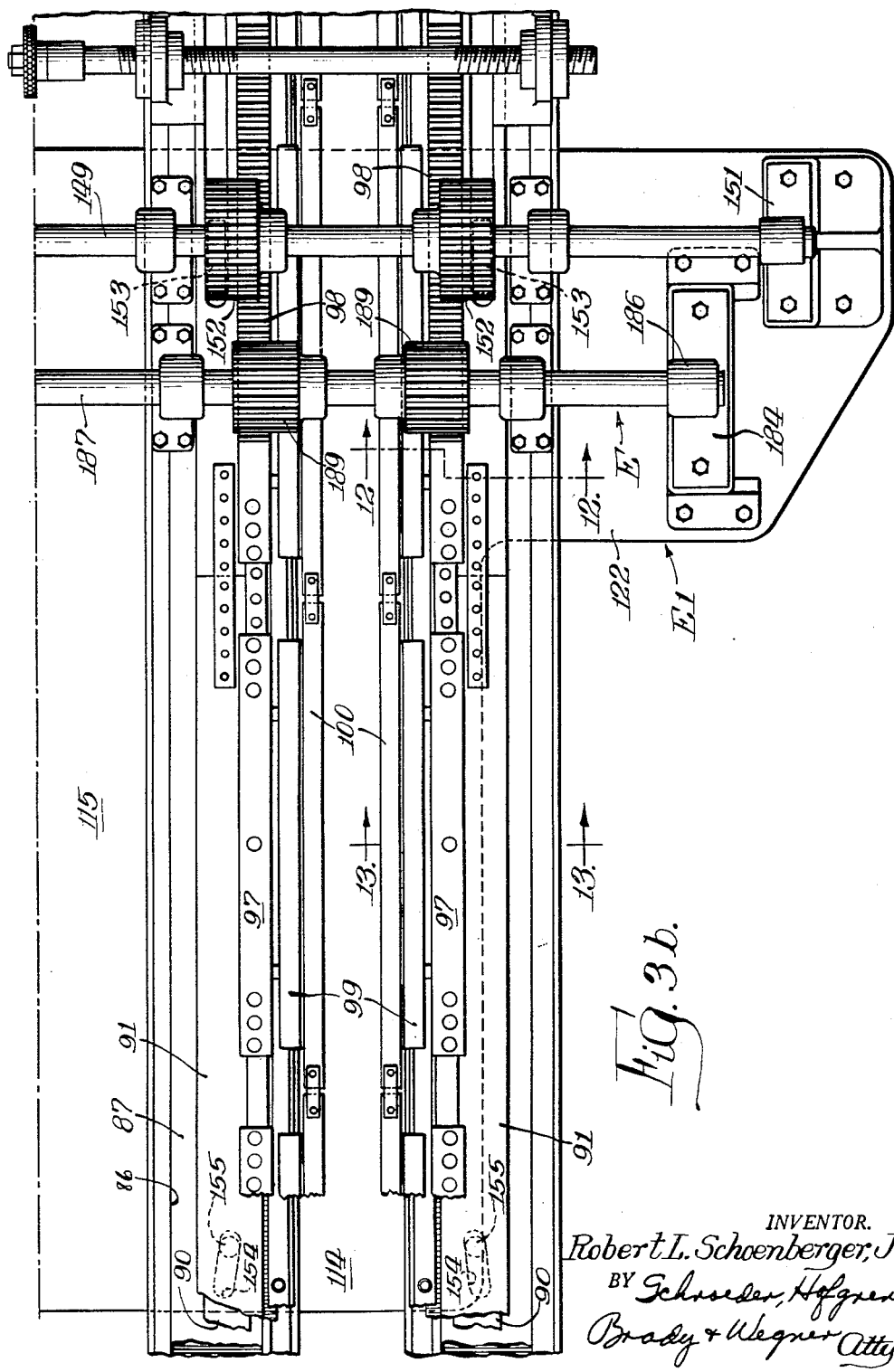

June 7, 1960  R. L. SCHOENBERGER, JR  2,939,161
MACHINE FOR FORMING HINGE JOINTS IN CASED BOOKS
Filed July 11, 1958  14 Sheets-Sheet 9
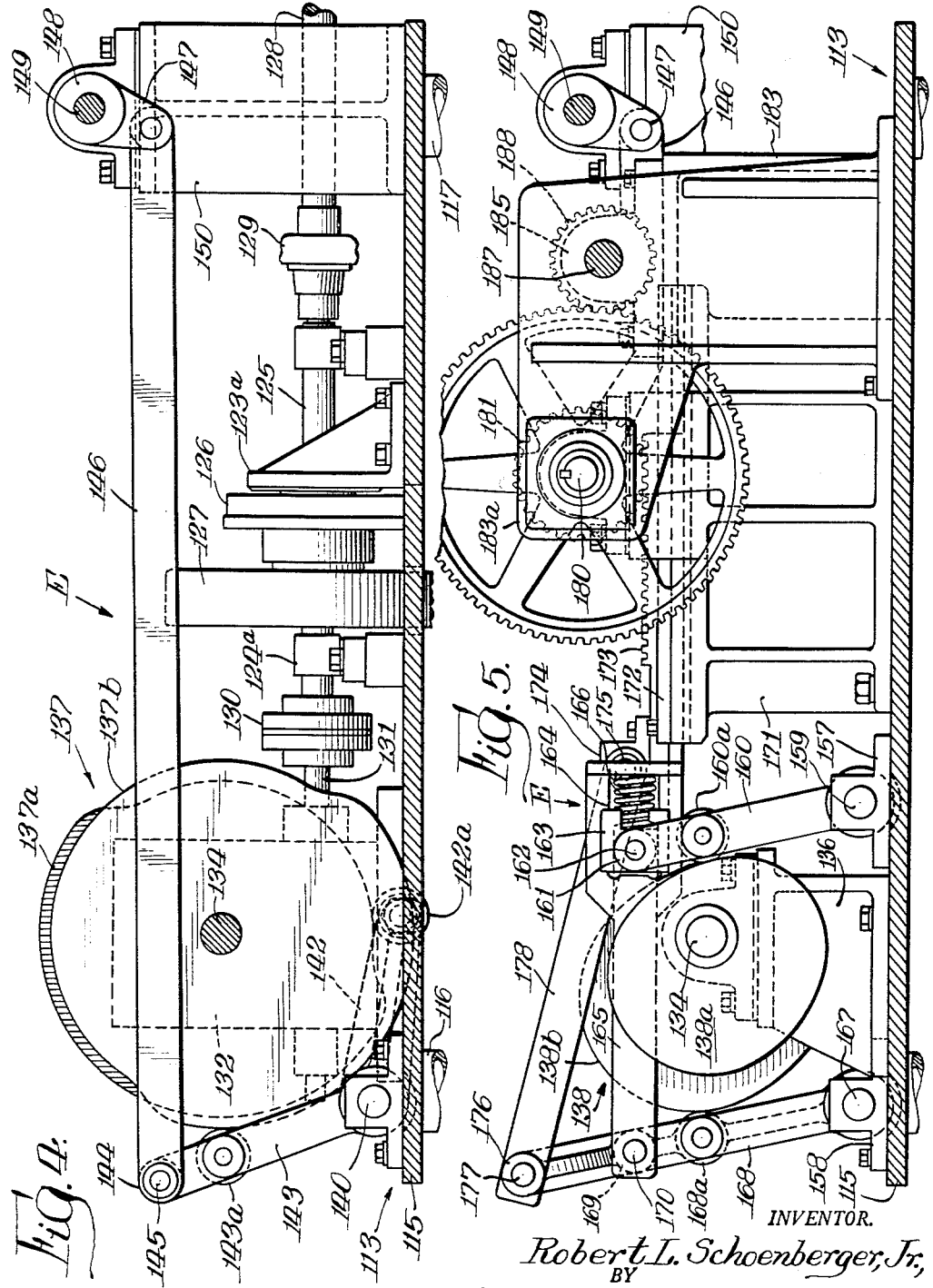
INVENTOR.
Robert L. Schoenberger, Jr,
BY
Schroeder, Hofgren, Brady & Wegner
Attys.

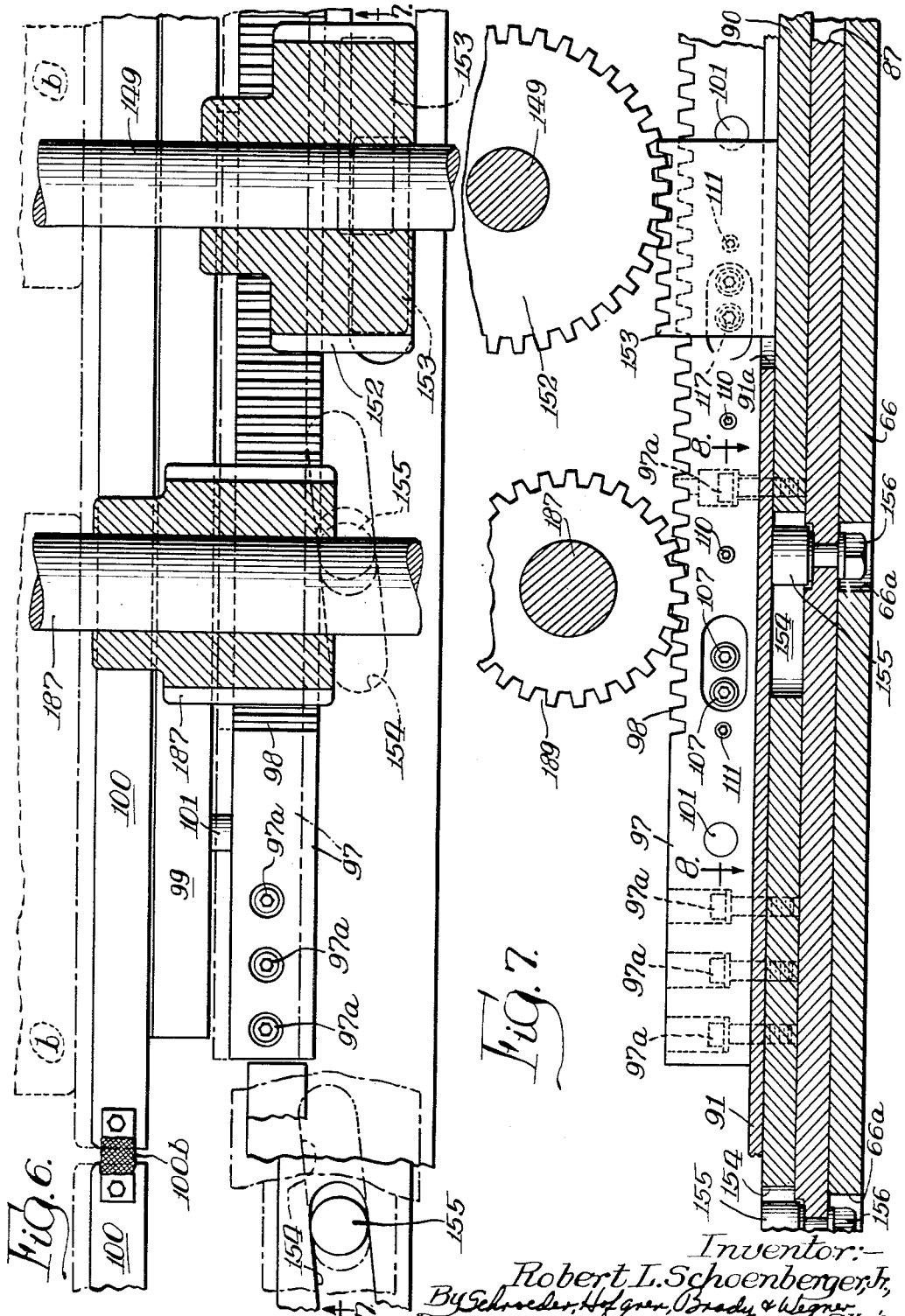

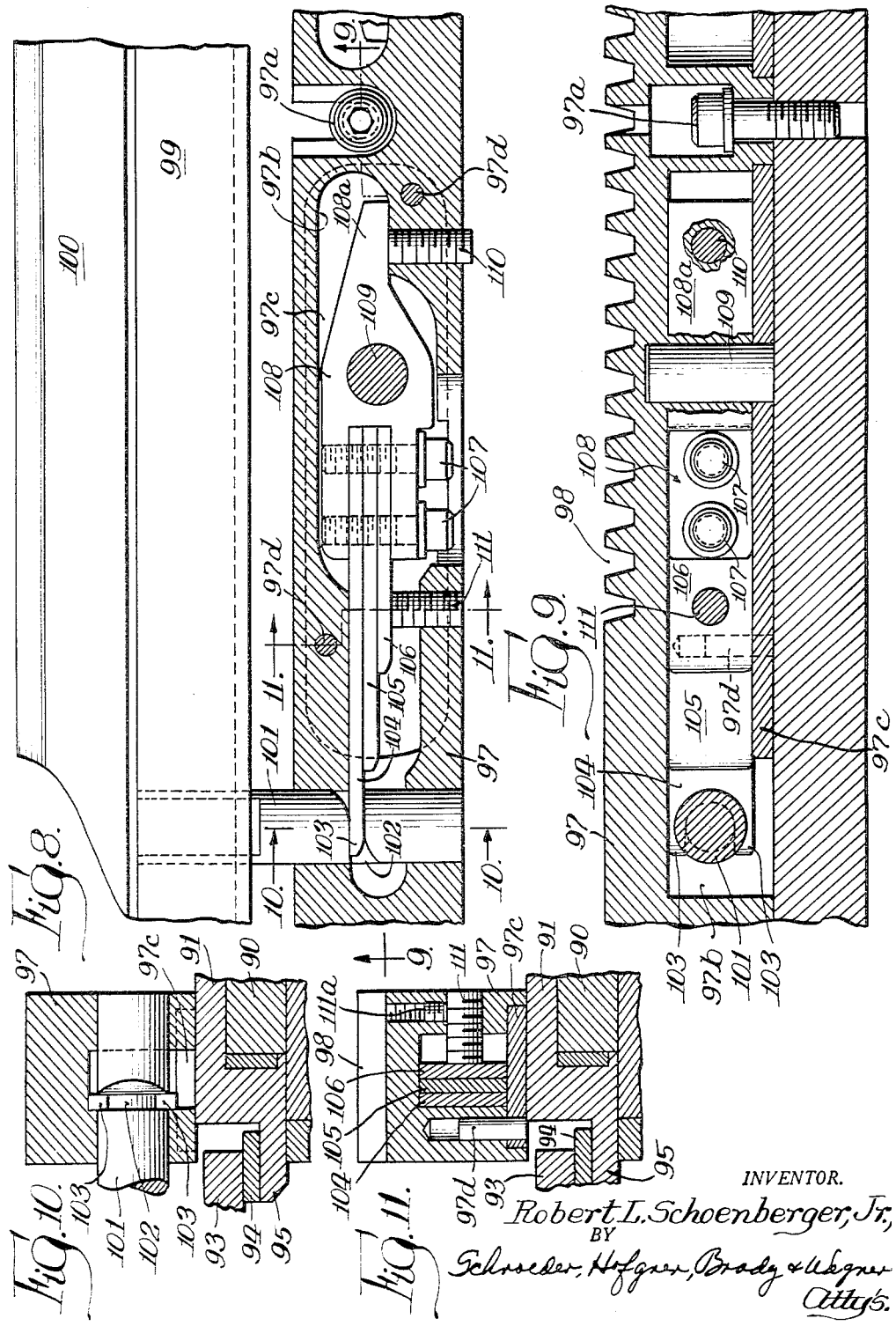

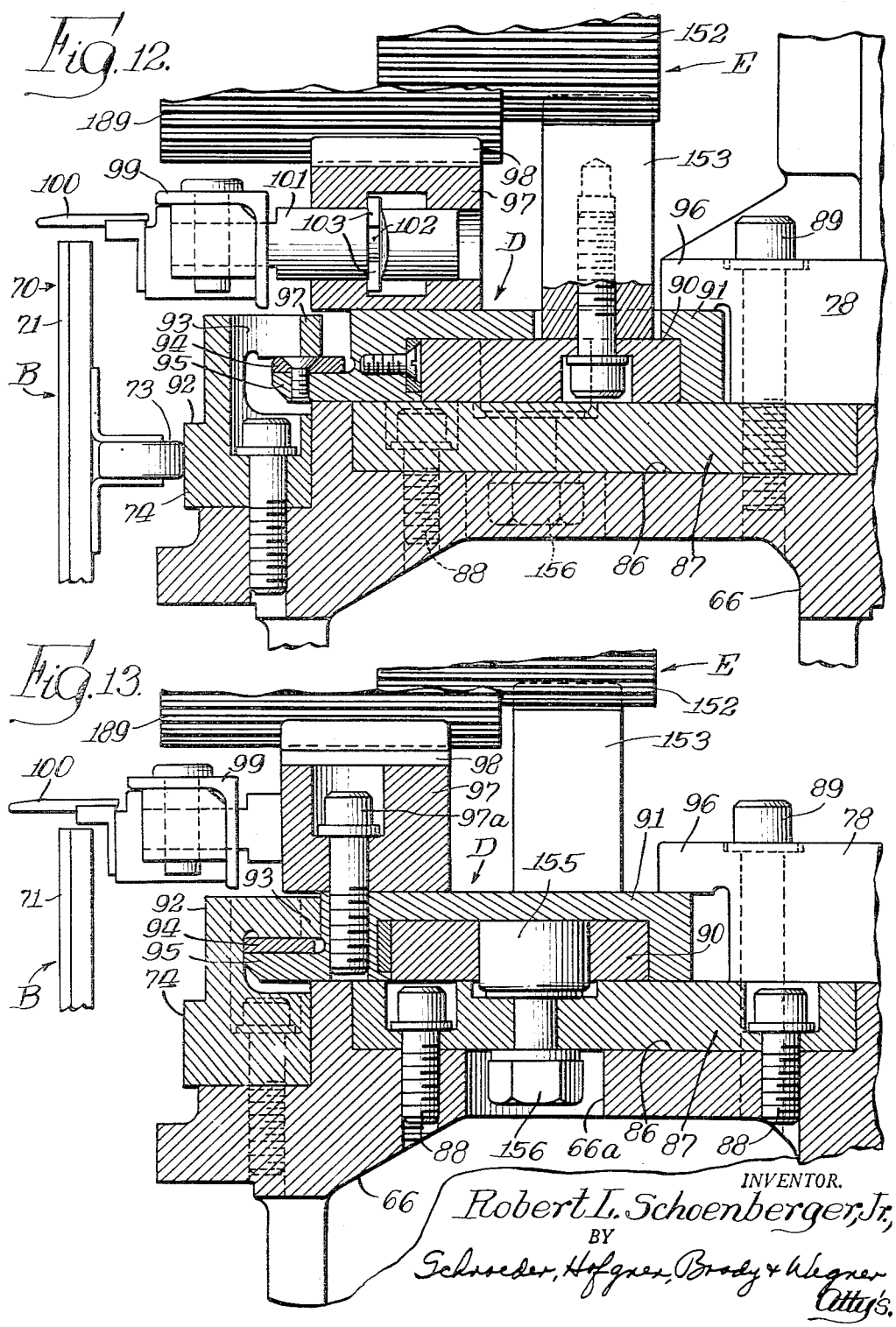

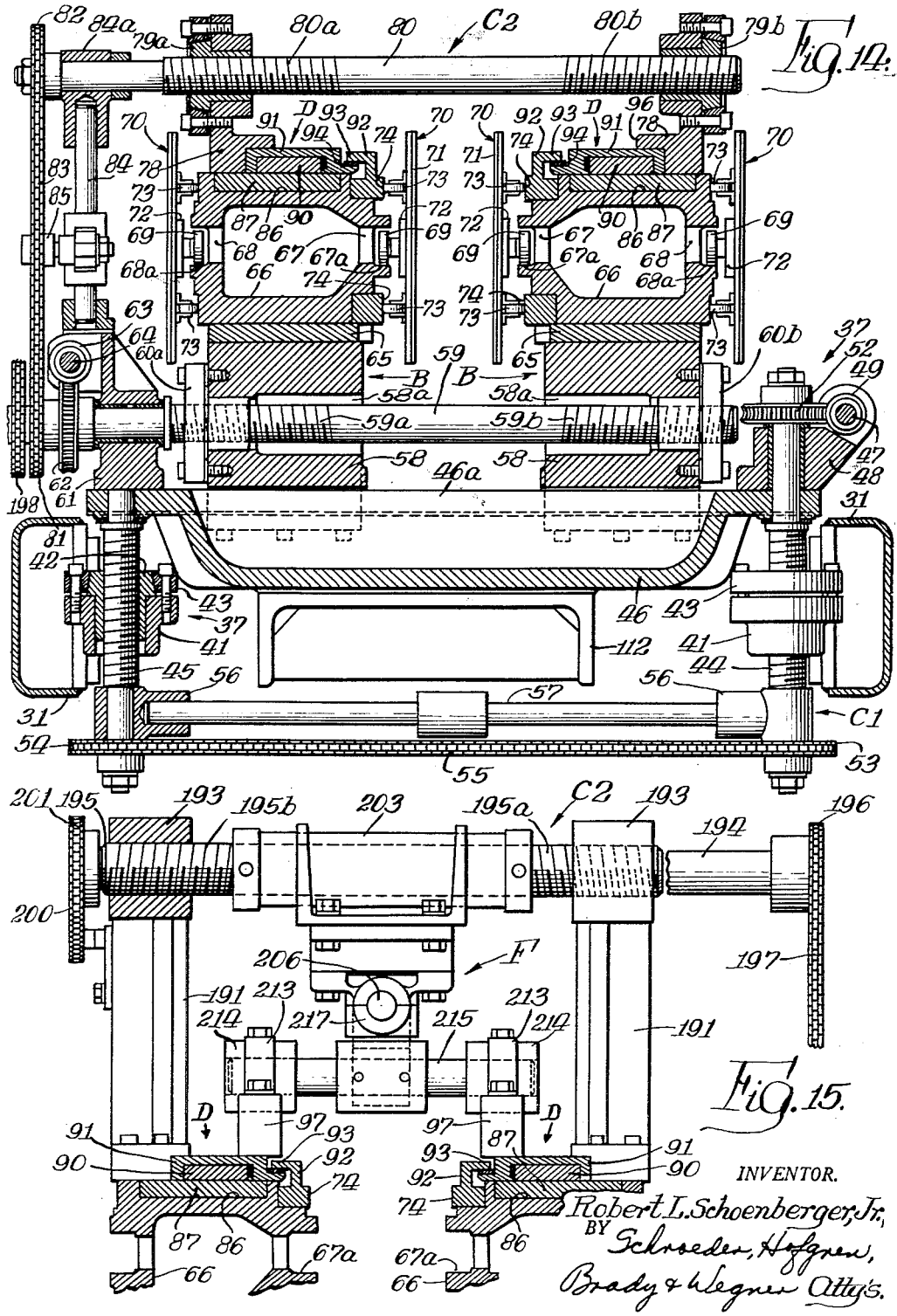

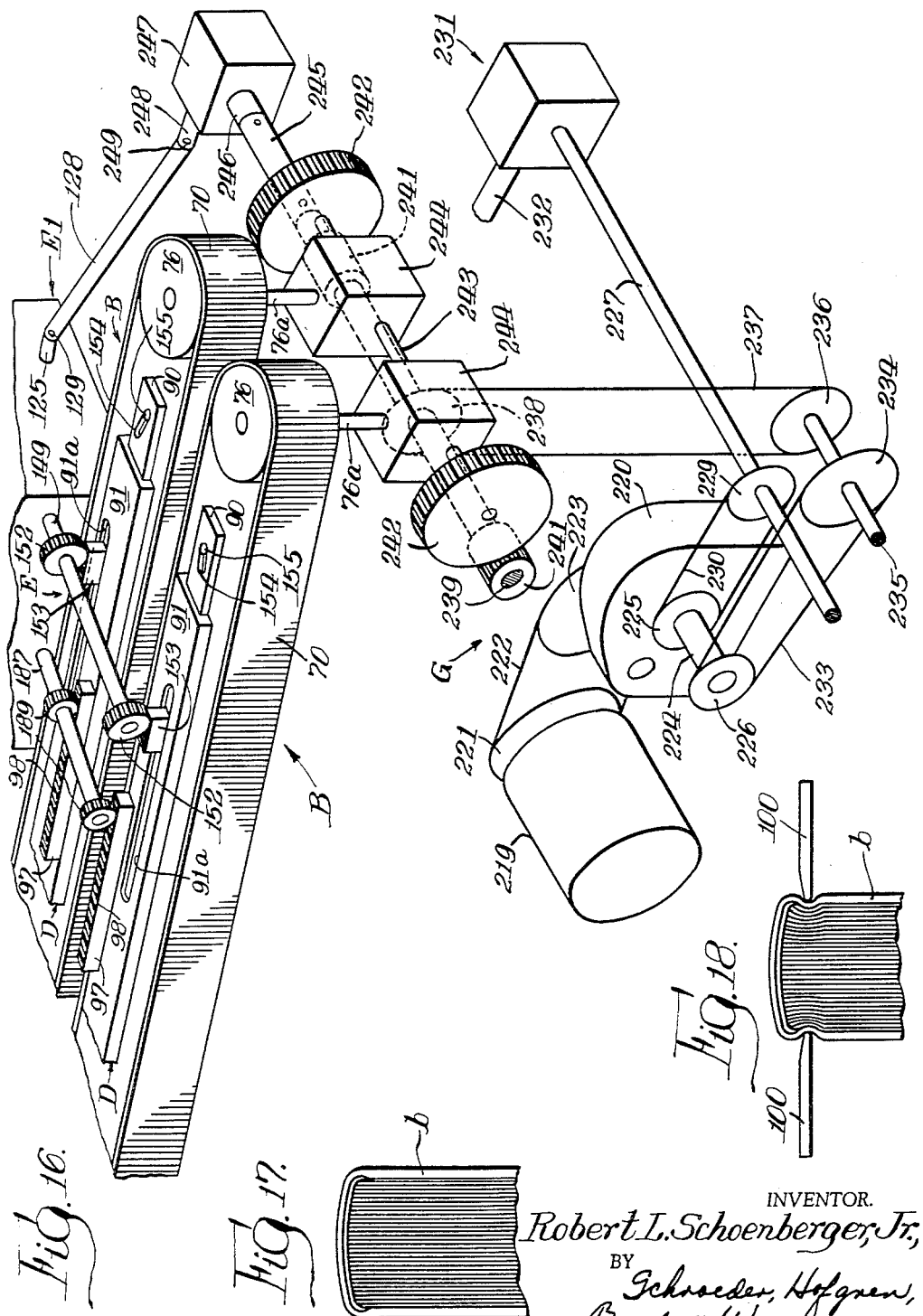

United States Patent Office 2,939,161
Patented June 7, 1960

2,939,161

MACHINE FOR FORMING HINGE JOINTS IN CASED BOOKS

Robert L. Schoenberger, Jr., Crawfordsville, Ind., assignor to R. R. Donnelley & Sons Company, a corporation of Delaware Filed July 11, 1958, Ser. No. 747,861

15 Claims. (Cl. 11—1)

This invention relates to a machine for forming hinge joints in cased books, and in particular it relates to a machine in which the books are carried continuously on a conveyor belt and the joint forming irons travel straight forward at the same speed as the books whenever they are in gripping engagement with the books.

In the construction of a cased book, the signatures forming the book are first fastened together by sewing or by patent binding. The unbound book may then be rounded and backed preparatory to receiving the case, or cover, after which it passes through a "case-in" machine which glues the cover to the rounded and backed book. At this point there is no well defined hinge joint in the case of the book, but only a slight looseness where the outer fabric of the case or cover is free of the hard boards of the cover.

In order that the book may open properly, and also to complete the bonding of the end sheets to the case and to the signatures forming the book, the book is then subjected to a joint forming operation which presses grooves into the area along the rear margins of the cover boards. Since the joint forming operation is the last prior to wrapping, book spoilage at this stage is very expensive, so a joint forming machine must be very dependable and not likely to mark or otherwise damage the book cover. At the same time, in view of the very high speed of modern rotary printing presses it is desirable to speed up all the operations involved in producing a book from the printed signatures, so that a high speed joint former which can operate on a moving line of books is highly desirable. The present invention provides such a machine.

Joint forming devices now in use with continuous book binding machinery are of two general types—the so-called "drag" type and the intermittent type. In the drag type the books are drawn through fixed forming irons. This obviously has a great tendency to smear or remove color from the book cover, or to damage the book cover in some other way. It is only suitable for relatively low speed operation because the more rapid travel through the fixed irons increases the likelihood of cover damage.

The intermittent type moves the books forward stepwise and the forming irons move into nipping contact with the books only while the books are stationary. This ordinarily requires either precise spacing or an escapement feeder for proper book movement through the machine. The operation almost eliminates book damage; but any intermittent feed is sharply limited in rate of operation, and the intermittent movement naturally is accompanied by all the usual problems of machine wear, vibration, etc. which are common to such devices. The maximum output of an intermittent joint former is at present limited to about 40 books a minute.

In accordance with the present invention books may be carried through a joint forming machine in random spacing with their joint areas longitudinally aligned and exposed. The joint forming irons move into nipping contact with the exposed areas of the books and simultaneously travel forward at the same speed as the books so that there is no dragging movement between the books and the irons. The irons move away from the books and return to their orginal positions where they may again close on the books which are carried in the conveyor means. Each book is nipped several times as it passes through the machine.

Some of the more widely used casing-in machines handle the books with their open edges down, spines up; so that the case may be dropped over the book spine and adhered to the end sheets in that position. Thus, it is also desirable to provide a book jointing machine which may handle the books in the same position in which they leave the casing-in machine, i.e. with the spines uppermost.

The principal object of the present invention, therefore, is to provide a machine for handling cased books with the spine uppermost and forming the hinge joint therein while the books are in continuous movement at relatively high speed, but without movement between the irons and the books when they are nipped.

Another object of the invention is to provide a joint forming machine which may be fitted into an assembly line including conventional casing-in machines, and may be coordinated with the operation of such machines.

Still another object of the invention is to provide a machine which will produce a high quality book hinge joint, and which will simultaneously exert uniform pressure on the book cover to smooth the cover and thus produce a cased book of the highest quality.

The invention is illustrated in a preferred embodiment in the accompanying drawings in which:

Figs. 1a, 1b, and 1c together provide a composite side elevational view of a machine embodying the invention, with certain parts broken away for clarity of illustration;

Figs. 2a, 2b, and 2c together provide a composite plan view of the machine with the shock absorber assembly, chain spacing mechanism, and certain other parts removed for clarity of illustration;

Figs. 3a and 3b together provide a composite plan view of the drive for the joint forming irons;

Fig. 4 is a section taken substantially as illustrated along the line 4—4 of Fig. 3a;

Fig. 5 is a section taken substantially as illustrated along the line 5—5 of Fig. 3a with parts broken away;

Fig. 6 is a fragmentary section on an enlarged scale taken substantially as illustrated along the line 6—6 of Fig. 1b, the parts being shown in solid lines as they are positioned at the end of a jointing stroke, with the irons retracted, and in dot dash lines with the irons in jointing position;

Fig. 7 is a fragmentary section taken substantially as illustrated along the line 7—7 of Fig. 6;

Fig. 8 is a fragmentary section on an enlarged scale taken substantially as illustrated along the line 8—8 of Fig. 7;

Fig. 9 is a fragmentary section taken substantially as illustrated along the line 9—9 of Fig. 8;

Fig. 10 is a fragmentary section taken substantially as illustrated along the line 10—10 of Fig. 8;

Fig. 11 is a fragmentary section taken substantially as indicated along the line 11—11 of Fig. 8;

Fig. 12 is a fragmentary vertical section of the iron drive and iron carrier assembly on an enlarged scale taken substantially as illustrated along the line 12—12 of Fig. 3b with the iron in retracted position;

Fig. 13 is a fragmentary vertical section of the iron assembly on an enlarged scale, taken substantially as illustrated along the line 13—13 of Fig. 3b, showing the iron in book nipping position;

Fig. 14 is a fragmentary vertical section on an enlarged scale taken substantially as illustrated along the line 14—14 of Fig. 1a;

Fig. 15 is a fragmentary section on an enlarged scale taken substantially as illustrated along the line 15—15 of Fig. 1a;

Fig. 16 is a diagrammatic view of the power train for the machine, showing the drive for the book conveyors and for the iron control cams;

Fig. 17 is a fragmentary end elevation of a book before the hinge joints are formed; and Fig. 18 is a fragmentary end elevation of a book nipped between the joint forming irons.

Referring to the drawings generally, and referring first to Figs. 1 to 3 inclusive, the present jointing machine consists generally of a base frame A; a pair of book conveyor chain assemblies indicated generally at B; adjusting mechanisms C1 for changing the height of chain assemblies B, and C2 for spacing the chains to accommodate the machine to books of different thickness (see also Figs. 14 and 15); a pair of jointing iron assemblies indicated generally at D; a jointing iron drive and control assembly indicated generally at E which includes a supporting frame E1; a shock absorber assembly indicated generally at F; and a power transmission assembly G, which also is illustrated diagrammatically in Fig. 16.

The base frame A is made in two parts, indicated generally at 20 and 21, having end legs 22 and 23, respectively, and abutting legs 22a and 23a, frame part 20 having lower frame elements 24 on its two sides while frame part 21 has similar frame parts 25. Legs 22 and 23 extend upwardly to provide end posts 26 and 27, respectively; while abutting legs 22a and 23a provide abutting posts 26a and 27a which, together with posts 28, 29 and 30 (Fig. 1c) support upper frame castings 31 and 32 of frame parts 20 and 21, respectively.

Frame A also includes such cross members as may be required for necessary rigidity, as indicated at 33 in Fig. 2a, 34 in Fig. 2b, and 35 and 36 in Fig. 2c.

The book conveyor assemblies B, jointing iron assemblies D, iron drive frame E1 and shock absorber assembly F are carried on adjustable support assemblies, indicated generally at 37 (Figs. 1a and 2a), 38 (Figs. 1b and 2b), 39 and 40 (Figs. 1c and 2c). The support assemblies are generally similar, and may best be understood by reference to Fig. 14, which is a transverse section through the machine at support assembly 37.

Mounted on upper frame castings 31 are bearing bosses 41 containing threaded inserts 42 which are removably secured in the bosses by cap rings 43. Rotatable in inserts 42 are upright jack screws 44 and 45 surmounting which is a cross beam 46; and the conveyor assemblies B, etc., are carried on a series of such cross beams, each of which is part of one of the adjustable support assemblies.

Adjusting mechanism C1 includes a longitudinal shaft 47 which is carried in suitable journal brackets 48 on the adjusting assemblies 37, 38, 39 and 40, and which has worms 49 engaging gears 50 which are keyed to the upper ends of jack screws 44 in all the support assemblies. A drive sprocket 51 on shaft (Fig. 1b) carries a chain 52 by means of which the shaft is rotated by an auxiliary motor (not shown) to raise and lower the conveyor assemblies B. As seen in Fig. 14, rotation of jack screws 45 on the opposite side of the frame is provided by sprockets 53 on the lower ends of jack screws 44, sprockets 54 on the lower ends of jack screws 45 and chains 55, which are trained around said sprockets. Bearing blocks 56 above sprockets 53 and 54 are connected by a tie bar 57 to prevent their rotation. Thus, the jack screws 44 and 45 in each of the support assemblies 37, 38, 39 and 40 may be simultaneously rotated to raise or lower the conveyor assemblies B, and with them the jointing iron assemblies D, iron drive assembly E, and shock absorber assembly F.

The described mechanism C1 is needed because the height of book conveyor assemblies B must be adjusted to bring the assemblies into proper alignment with outfeed mechanism M (Fig. 1a) of a casing-in machine which delivers the cased books b to the book jointer as seen in Figs. 1a and 2a. Proper support of the books in the conveyor assemblies B requires that only the portion immediately adjacent the book spine be free of the conveyor members, and this means that the conveyor assemblies B must be adjusted in accordance with the edge to spine dimension of the books passing through the machine. The conveyor assemblies must be positioned at a higher level for books which are wide from edge to spine, and at a lower level for books which are narrow from edge to spine.

Referring again to Fig. 14, each cross beam 46 includes a transverse web 46a which provides a cross way for a pair of laterally movable conveyor assembly supports 58 having bores 58a to receive transverse adjusting screws 59 the two end portions of which are oppositely threaded at 59a and 59b to engage screw plates 60a and 60b on conveyor assembly supports 58. Thus, rotation of transverse adjusting screw 59 either increases or decreases the space between supports 58.

Mounted on cross beam 46 at one end of adjusting screw 59 is a bearing block 61 which supports one end of screw 59; and on said end of screw 59 is a gear 62 which meshes with a worm 63 on a longitudinal shaft 64 by means of which power for changing the spacing between conveyor assemblies B is transmitted the entire length of the machine through suitable worm and gear drives associated with the support assemblies 38, 39 and 40 in the usual manner.

Surmounting conveyor assembly supports 58 are longitudinal plates 65 which extend the entire length of the machine and carry hollow longitudinal conveyor guide beams 66 which also extend the entire length of the machine. Guide beams 66 have longitudinal recesses 67 and 68 along their inner and outer faces, respectively, and said recesses are provided with coplanar track surfaces 67a and 68a for carrier rollers 69 of book conveyor chains 70. Conveyor chains 70 are of a conventional type having book gripping plates 71 on their outer faces and brackets 72 on their inner faces to receive the carrier rollers 69, the upper and lower portions of the plates being supported on conventional roller chains 73 which bear against longitudinal guide surfaces 74. As seen in Figs. 2a and 2c, book conveyor chains 70 are carried on sprockets 75 at the infeed end of the machine and 76 at the outfeed end, said sprockets being carried in suitable journal brackets at the ends of beams 66. At the infeed end the chains are also guided around arcuate fixed guide members 77.

Proper adjustment of the space between the conveyor assemblies B requires that the adjusting force be applied at the top and bottom of said assemblies, and also at the top of shock absorber assembly F. This is accomplished by components of chain space adjusting mechanism C2 which are seen in Figs. 14 and 15.

Surmounting guide beams 66 for the conveyor assemblies are brackets 78 which are disposed vertically above conveyor supports 58, and said brackets are bored to receive threaded bushings 79a and 79b for an upper transverse adjusting screw 80 the two end portions of which are oppositely threaded at 80a and 80b so as to apply force to the upper parts of conveyor assemblies B in the same way that the transverse adjusting screw 59 applies force to the lower parts of said assemblies. Rotation of adjusting screw 59 is transmitted to adjusting screw 80 by means of sprockets 81 and 82 mounted, respectively, on screws 59 and 80, and a roller chain 83 trained over both said sprockets. The end portion of screw 80 adjacent sprocket 82 is carried in a hollow bushing 84a which is mounted on a bracket 84. Bracket 84 also carries an adjustable idler sprocket 85 for maintaining tension on chain 83. The mechanism for transmitting adjusting force to shock absorber assembly F will be described in detail in connection with the description of that assembly.

The construction of jointing iron assemblies D is best seen in Figs. 6 to 14 inclusive. As seen in Fig. 14, the tops of hollow guide beams 66 of conveyor assemblies B are recessed at 86 to receive carrier plates 87 which extend the entire length of the machine and form the bases for jointing iron assemblies D. As best seen in Figs. 12 and 13, carrier plates 87 are secured to guide castings 66 by means of bolts 88 which are countersunk in the carrier plates, and also by means of bolts 89 which secure brackets 78 to the guide beams 66.

The tops of carrier plates 87 are smoothly surfaced and hardened to provide suitable beds for cam rails 90 which extend the entire length of the machine, and iron sliders 91 which are in the form of inverted channels extending the entire length of the machine overlying the cam rails 90. Sliders 91 must reciprocate longitudinally in the machine in a long stroke as the books pass through the machine, and must also move laterally in and out to close the jointing irons on the books. Cam rails 90 are free to move longitudinally relative to sliders 91, and provide the lateral, in and out movement for the sliders; while the latter are slidably retained on member 87 by means of elongated gib rails 92 which have overhanging retaining flanges 93 overlying hardened wear plates 94 which are secured to inwardly extending wear plate support flanges 93 on sliders 91. The guide surfaces 74 for conveyor belt wheels 73 are also afforded by gib members 92. Opposite the overhanging flanges 93 of gib rails 92 are flanges 96 which are integral with support brackets 78.

As seen in Figs. 2a, 2b, and 2c, a series of iron support bars 97 is bolted to the tops of iron sliders 91 by bolts 97a (Fig. 13); and the support bars 97 adjacent the central portion of the machine have gear teeth cut into their top surfaces providing racks 98 through which the iron sliders may be reciprocated by the iron drive and control mechanism E. (See also Figs. 12 and 13.) Jointing iron brackets 99 and jointing irons 100 are mounted upon the iron support bars 97 as detailed in Figs. 8 to 12 inclusive.

In order to accommodate the operation of jointing irons 100 to minor variations in book thickness, and to prevent book damage during the jointing operation, each jointing iron 100 and its support bracket 99 is resiliently mounted on support bars 97 by means of a pair of slidable support pins 101 which extend through chambers 97b in the support bars and are notched at 102 to receive arms 103 of bifurcated leaf springs 104. The springs 104, together with spring leaves 105 and 106 are secured by bolts 107 in a spring carrier 108 which is supported on an upright pivot 109 in chamber 97B of the support bars 97. The angular disposition of spring carrier 108 may be varied by means of a set screw 110 which bears upon an extension finger 108a of the spring carrier, and this, combined with a spring adjusting screw 111 which bears against leaf spring 106, serves to vary the pressure with which the jointing irons 100 engage books in the machine. As seen in Fig. 11, adjusting screws 111 may be locked in place with locking screws 111a. The bottom of chamber 97b is closed by a plate 97c which is held in place by pins 97d.

Since proper jointing of books requires heat as well as pressure, jointing irons 100 are provided with electric heating elements (not shown) which are connected by electric leads 100a (Fig. 2a) to a source of electric power. Jointing irons 100 are attached together by suitable electric connectors 100b, and connection across from one jointing iron 100 to the other is accomplished by a cross connector 100c, so that the two sets of jointing irons 100 are a continuous electric circuit.

Iron drive and control mechanis E, together with its associated supporting framework E1, is illustrated generally in Figs. 1b and 2b, and in more detail in Figs. 3a, 3b, 4 to 7 inclusive, 12 and 13.

Framework E1 is supported upon a longitudinal beam 112 (see Fig. 14) which is secured to the bottoms of the cross beams 46 of conveyor assemblies B which are mounted upon the adjusting assemblies 38 and 39 seen in Figs. 1b and 1c. An iron control base plate, indicated generally at 113, has a downwardly dished central supporting portion 114 (see Fig. 1b) which conforms generaly to the shape of the cross beams 46 and rests upon the longitudinal supporting channel member 112. As seen in Figs. 2b, 3a and 3b, base plate 113 also has a laterally extending main platform portion 115 at one side of the machine main frame A, the outer corners of said platform being supported on jack screws 116 and 117 by means of which the length of the supports for said platform 115 may be adjusted in conjunction with any vertical adjustment of the conveyor assembly B. As seen in Figs. 1b and 2b, such adjustment of the jack screws 116 and 117 is afforded by means of a roller chain and sprocket drive which includes a sprocket 118 mounted on the lower end of jack screw 45 in adjustable support mechanism 38, a pair of sprockets 119 and 120 mounted, respectively, on jack screws 116 and 117, and a roller chain 121 which is trained around all three of said sprockets. Thus, any movement of the vertical adjusting mechanism C1 for conveyor assembly B is transmitted to jack screws 116 and 117. At the side of base plate 113 opposite main platform 115 is a smaller lateral extension 122 which supports the ends of a pair of shafts through which iron slider channel 91 and cam rail 90 receive their movement from the iron drive and control mechanism E supported upon main platform 115, as will be described.

Supporting frame assembly E1 also includes corner posts 123 supporting a canopy 124, so that with the addition of customary guard screens the entire drive and control mechanism may be housed to prevent possible injury to persons working with the machine.

Referring now particularly to Figs. 3a, 3b, 4 and 5, main platform 115 is provided adjacent its outer side with a pair of upright shaft bearing brackets 123a and 124a in which are supported an input shaft 125 having an electric brake 126 and a flywheel 127 mounted thereon between brackets 123 and 124. Input shaft 125 receives its power from a drive shaft 128 through a universal joint coupling 129, and its opposite end is connected by a rigid coupler 130 with input shaft 131 of a gear reducer 132. An output shaft 133 of gear reducer 132 is coupled to a cam shaft 134 which is supported in bearing brackets 135 and 136 which supports two separate sets of conjugate control cam sets, indicated generally at 137 and 138. Conjugate cam set 137 produces the lateral, in and out movement of jointing irons 100, while conjugate cam set 138 provides the longitudinal travel of the irons.

Associated with conjugate cam set 137 is a pair of cam follower shaft brackets 139 supporting a fixed shaft 140 on which a sleeve 141 is rockably supported. Sleeve 141 has a pair of integral cam follower arms 142 and 143, said follower arms being provided, respectively, with cam follower rollers 142a and 143a which bear, respectively, upon cams 137a and 137b of cam set 137. At the upper end of cam follower arm 143 is a boss 144 to receive a pin 145 which serves as the bearing mounting for one end of a drive link 146. The opposite end of drive link 146 is connected to a crank arm 147 of a crank member 148 which is keyed to a rock shaft 149 the ends of which are journaled on top of a bracket 150 on main platform 115 and a bracket 151 on lateral platform extension 122 (Fig. 3b).

As best seen in Figs. 3b, 6 and 7, rock shaft 149 carries a pair of pinions 152 which engage short gear rack blocks 153 mounted on cam rail 90 and extending through a longitudinal slot 91a in jointing iron slider 91. Cam rail 90 is provided with diagonally disposed cam slots 154 in which are positioned fixed cam rollers 155 mounted on the carrier plates 87 of jointing iron assemblies D by means of bolts 156 which extend upwardly through openings 66a in guide beams 66 (Figs. 7 and 13).

As conjugate cams 97a and 97b rotate, they act through the cam followers 142 and 143 to reciprocate drive link 146, which acts on crank arm 147 to rock the shaft 149. This rocking movement, transmitted through pinions 152 and rack blocks 153 to cam rails 90, causes said rails to reciprocate with a very short stroke beneath iron slider channels 91. The fixed cam rollers 155 and diagonal cam slots 154 cooperate to move cam rails 90 laterally, thus intermittently moving sliders 91 toward and away from each other to close irons 100 on books b or retract said irons.

Longitudinal movement of iron sliders 91 is produced through conjugate cam set 138 and a related cam follower and drive mechanism. Associated with conjugate cam set 138 are two pairs of cam follower arm brackets numbered, respectively, 157 and 158, which are on opposite sides of cam shaft 134 (see Figs. 3a and 5). Mounted in brackets 157 is a fixed pin 159 on which a bifurcated cam follower arm 160 is rockably mounted, said arm being provided with a follower roller 160a which bears against a cam 138a of conjugate cam set 138. An upward extension of follower arm 160 is provided with a boss 161 from one side of which a connector pin 162 extends to carry a pivoted slide block 163 which is mounted in a slideway 164 of a connecting link 165. A resilient connection between slide block 163 and link 165 is provided by a compression spring 166 which is positioned in the slideway bearing against the slide block. Mounted in the pair of brackets 158 is a fixed shaft 167 on which a bifurcated cam follower arm 168 is mounted, said arm having a cam follower roller 168a which bears against a cam 138b of conjugate cam set 138. Above follower roller 168a cam follower arm 168 has a boss 169 for a projecting pin 170 by means of which follower arm 168 is pivotally connected to link 165.

Directly behind bifurcated follower arm 168 is a supporting bracket 171 on top of which is a slideway 172 for a slidable, toothed gear rack 173. On the end of gear rack 173 adjacent cam 138b in a mounting block 174 for a cross pin 175. At the extreme upper end of cam follower arm 168 is a hollow boss 176 for a cross pin 177, and a pair of drive links 178 are pivotally mounted upon the cross pins 175 and 177 so as to afford a driving connection between cam follower arm 168 and slidable gear rack 173. Due to the cushioned linkage between cam follower arms 160 and 168 through link 165, longitudinal sliding movement of gear rack 173 in slideway 172 is controlled jointly by the operation of cams 138a and 138b of conjugate cam set 138.

Surmounting bracket 171, and flanking slideway 172 is a pair of bearing brackets 179 (Fig. 5) in which a shaft 180 is rotatably mounted. A pinion 181 on shaft 180 is engaged with gear rack 173, and said shaft also carries an output gear 182. A supporting base member 183 on platform portion 115 and a base member 184 on platform extension 122 on the opposite side of the jointing iron assembly (see Fig. 3b) support bearing bosses 185 and 186, respectively, in which a drive shaft 187 for jointing iron sliders 91 is rotatably mounted. On shaft 187 is a drive gear 188 which meshes with gear 182, and a pair of pinions 189 on shaft 187 (Figs. 6 and 7) engage gear racks 98 upon the jointing iron support bars 97 in order to reciprocate the jointing iron sliders 91 in accordance with movement of sliding rack 173, but at a higher rate of speed and through a longer stroke.

As seen in Fig. 3a, the outer end portion of shaft 180 is journaled in a bracket 183a which is a part of supporting base 183 for shaft 187.

The conjugate cam sets 137 and 138 are laid out in such a way that the jointing irons 100 on their sliders 91 start quickly and move forward in a working stroke at the same speed as books b in conveyor belts 70. As soon as the speed of the jointing irons is equal to that of the books, cam set 137 acts through its associated mechanism to rock shaft 149 counterclockwise and cause pinions 152 acting through rack blocks 153 to drive cam rails 90 a short distance toward the outfeed end of the machine (to the right as seen in Fig. 6), so that the fixed cam rollers 155 acting in slots 154 close the jointing irons 100 on books b in the conveyor. Cam set 137 has a substantial dwell so that the jointing irons remain in jointing contact with the books during most of the forward stroke of the iron sliders 91, which is the working stroke of the irons. Shortly before the end of the forward stroke the cam set 137 acts through its associated mechanism to rock shaft 149 clockwise, thus retracting jointing irons 100 so that they are out of contact with the books before the sliders 91 and jointing irons 100 are moving more slowly than the books. The sliders then stop rapidly and the mechanism operated by conjugate cam set 138 moves gear rack 173 back toward its original position at a higher speed than that of the working stroke, so that pinions 189 acting through gear racks 98 on the sliders 91 bring the jointing irons 100 back to their original positions at a high speed to begin a new working stroke at the same speed as the books.

The high speed return stroke of the jointing irons requires that the machine be provided with a shock absorber assembly F, and this is best seen in Figs. 1a and 15. As seen in Fig. 1a, shock absorber assembly F includes two pairs of supporting standards 190 and 191 which, as seen in Fig. 15, are bolted to hollow guide beams 66 with portions overhanging jointing iron sliders 91, in the same manner as the upper brackets 78 of conveyor chain space adjusting mechanism C2. Stands 190 and 191 are topped by hollow threaded bosses 192 and 193, respectively, in which are mounted supporting screws 194 and 195, respectively, both of which have oppositely threaded end portions such as the end portions 195a and 195b of screw 195, seen in Fig. 15. One end of supporting screw 194 extends outwardly past the stand 190 and carries a sprocket 196 from which a drive chain 197 extends around a sprocket 198 on lower adjusting screw 59 of the chain spacing adjustment mechanism C2. On the opposite end of supporting screw 194 is a sprocket 199 on which a chain 200 is trained which also passes around a sprocket 201 on supporting screw 195; so that rotation of adjusting screw 59 is transmitted to the shock absorber assembly supporting screws 194 and 195. Thus, stands 190 and 191 may move in and out with the conveyor chain assemblies B, without disturbing the shock absorber elements carried on the supporting screws.

A longitudinal channel member 202 has mounting sleeves 203 by means of which it is carried on unthreaded central portions of supporting screws 194 and 195.

Mounted beneath beam 202 between stands 190 is an extension bracket 203 which projects toward the infeed end of the machine and carries a hollow bearing 204; and mounted between the two pairs of stands 190 and 191 is a central hollow bearing 205, there being a shock absorber rod 206 slidably mounted in said bearings 204 and 205. Suspended from beam 202 between stands 191 is a two way air cylinder 207 having a piston rod 208 connected to rod 206 by a rigid coupling 209. Spaced along rod 206 from bearing 204, and substantially between stands 190, is an adjustable spring collar 210; and a coil compression spring 211 surrounds rod 206 between said collar and said bearing. A stop collar 212 is clamped on rod 206; and the air cylinder 207 and coil spring 211 are adjusted to position stop collar 212 normally a predetermined short distance from said hollow bearing 205.

Supported on jointing iron mounting bars 97, surmounting the iron slider channels 91 between the pair of stands 190 and 191, are two sets of brackets 213 each of which has a slide bushing 214, and slidably carried in said slide bushings are cross bars 215; so that the adjustment of the book conveyor spacing by mechanism C1 does not move the cross bars 215. Mounted on cross bars 215 is a support block 216 which has a slide ring 217 embracing shock absorber rod 206 between spring collar 210 and stop collar 212.

As the jointing iron sliders 91 reciprocate in their relatively slow working stroke and relatively fast return stroke, as previously described, the slide ring 217 butts first against stop collar 212 and then against spring collar 210. Striking stop collar 212 thrusts piston rod 208 into air cylinder 207, which is set for slow air release so as to provide an effective snubbing or shock absorbing action for the working stroke. The air cylinder reverses during the return stroke of the slider 91, and the return stroke is much faster than the working stroke so a stronger snubbing action is provided for the return by means of compression spring 211 which supplements the action of air cylinder 207 caused by outward movement of piston rod 208.

The present shock absorber affords an easy means of supplementing the action of a two way air cylinder in snubbing both ends of a stroke which moves at a different speed in its two directions of movement.

The power supply for the machine is illustrated diagrammatically in Fig. 16; while the actual locations of certain parts are shown in Figs. 1c and 2c, where a platform 218 is seen to be mounted in the lower part of base frame A to support an electric motor 219 and gear reducer 220 which furnish and distribute the power for driving the book conveyor belts 70, the jointing iron drive E, and also the casing-in machine with which the jointing machine is used. Motor 219 has a drive shaft carrying a sprocket 221 for a drive chain 222 which is also trained around a sprocket 223 on the input shaft of gear reducer 220, the output shaft 224 of which carries sprockets 225 and 226 for driving the casing-in machine and jointing machine, respectively.

A cross shaft 227 carried in suitable brackets 228 on base frame A has a sprocket 229 for a chain 230 by which shaft 227 is driven from sprocket 225. Shaft 227 operates through a synchronizing clutch mechanism, indicated generally at 231, to drive a shaft 232 which extends the entire length of base frame A to drive the conveyor M and other parts of the casing-in machine. The casing-in conveyor M and the book conveyors 70 must be coordinated and synchronized so that books b will be fed between jointing irons 100 with no part of a book in the space between two irons; and this is accomplished by synchronizing mechanism 231 which is old in the art and forms no part of the present mechanism.

Sprocket 226 operates through a chain 233 to drive a sprocket 234 on a jack shaft 235 which also carries a sprocket 236 from which a drive chain 237 extends upwardly and is trained around a sprocket 238 on a main power shaft 239 which distributes the power to book conveyor chains 70 and iron drive E. As seen in Fig. 1c, shaft 239 is journaled in the upper ends of base frame end supports 27, and has a large flywheel 240 at one side of the base frame. Book conveyor chains 70 are driven from pinions 241 on shaft 239, which mesh with gears 242 on a shaft 243. Associated with shaft 243 are suitable gear boxes, indicated generally at 244, which include bevel gear sets (not shown) on the shaft 243 and on upright drive shafts 76a of drive sprockets 76 for the book conveyors 70.

Main power shaft 239 is seen in Fig. 2c to be connected through a universal joint drive 245 with the input shaft 246 of a gear box 247, the output shaft 248 of which is connected through a universal joint 249 with the drive shaft 128 for jointing iron drive E.

The operation of the device is believed to be clear from the foregoing description. Books b are fed from the casing-in machine by conveyor mechanism M into the conveyor chains 70, which compress the books as they are carried through the jointing machine. In order to synchronize the feed of books into the jointing machine with the reciprocation of the jointing irons 100, and to assure that no book extends across the space between two irons, the casing-in machine is driven from the jointer drive mechanism G through synchronous clutch mechanism 231.

As books are carried through the machine, the jointing iron drive and control mechanism E reciprocates the jointing iron sliders 91, and moves the irons laterally in and out of joint forming engagement with the books, as previously described in detail in connection with the mechanism E.

Movement of the jointing iron sliders 91 is snubbed at the end of a jointing stroke by the action of the fluid cylinder and piston 207 of shock absorber mechanism F; while the high speed return stroke of the sliders is snubbed by said fluid cylinder and piston with the assistance of booster spring 211.

The foregoing detailed description is given for clearness of understanding only and no unnecessary limitations are to be understood therefrom, as some modifications will be obvious to those skilled in the art.

I claim:

1. A book jointing machine comprising: a frame; conveyor means on the frame for compressing the cases of books and carrying them through the machine with their hinge areas exposed; a pair of iron sliders on the frame flanking the conveyor means; opposed jointing irons on said sliders in the plane of the hinge areas of books in the conveyor means; drive means on the frame; first power transmission means operatively connecting said drive means with said iron sliders to reciprocate the sliders longitudinally in a long, straight line jointing stroke at the same speed as the conveyor means and parallel to books in said means, and in a straight line return stroke; longitudinally reciprocable cam rail means on the frame which operatively engage the iron sliders; interengaging means on the frame and the cam rail means to move the cam rails laterally and second power transmission means operatively connecting the drive means with said cam rail means to reciprocate the cam rail means and thus move the iron sliders a short distance laterally to close the jointing irons on books in the conveyor early in a jointing stroke and retract them out of contact with the books near the end of said stroke.

2. A book jointing machine comprising: a frame; conveyor means on the frame for compressing the cases of books and carrying them through the machine with their hinge areas exposed; a pair of iron sliders on the frame flanking the conveyor means; opposed jointing irons on said sliders in the plane of the hinge areas of books in the conveyor means; drive means on the frame; first power transmission means including a gear rack on each iron slider, a pair of pinions, each of which engages one of said racks, and means operatively connecting said pinions with the drive means to drive said pinions alternately in opposite directions to reciprocate the sliders longitudinally in a long jointing stroke at the same speed as the conveyor means and parallel to books in said means, and in a return stroke; cam rail means on the frame which operatively engage the iron sliders; and second power transmission means including a gear rack block on each cam rail, a pair of gears, each of which engages one of said rack blocks, and means operatively connecting the gears with the drive means to drive said gears alternately in opposite directions and cause said cam rails to move the iron sliders laterally and close the jointing irons on books in the conveyor early in a jointing stroke and retract them out of contact with the books near the end of said stroke.

3. The device of claim 2 in which the means operatively connecting the pinions and the gears with the drive means includes a driven cam shaft, two separate conjugate cam sets on said shaft, means operatively connecting one of said cam sets with the pinions, and means operatively connecting the other of said cam sets with the gears.

4. A book jointing machine comprising: a frame; conveyor means on the frame for compressing the cases of books and carrying them through the machine with their hinge areas exposed; a pair of iron sliders on the frame flanking the conveyor means; opposed jointing irons on said sliders in the plane of the hinge areas of books in the conveyor means; drive means on the frame; first power transmission means operatively connecting said drive means with said sliders to reciprocate the sliders longitudinally in a long, straight line jointing stroke at the same speed as the conveyor means and parallel to books in said means, and in a return stroke; a pair of cam rails making pin and slot connections with the frame, one of said cam rails slidably engaging each iron slider; second power transmission means for reciprocating said cam rails so that said pin and slot connections move the iron sliders a short distance laterally and close the jointing irons on books in the conveyor early in a jointing stroke and retract them out of contact with the books near the end of said stroke.

5. A book jointing machine comprising: a frame; conveyor means on the frame for compressing the cases of books and carrying them through the machine with their hinge areas exposed; a pair of iron sliders on the frame flanking the conveyor means; opposed jointing irons on said sliders in the plane of the hinge areas of books in the conveyor means; drive means on the frame; first power transmission means operatively connecting said drive means with said sliders, said means including gear rack and pinion means for imparting a long reciprocating motion to said sliders at the same speed as the conveyor means and parallel to books in said means; a plurality of upright pins in the frame adjacent each slider; a pair of cam rails slidably mounted on the frame, each rail having a plurality of diagonal slots engaged with said pins and one of said rails slidably engaging each iron slider; second power transmission means operatively connecting the drive means with said cam rails through gear and gear rack means which impart a short longitudinal motion to said rails to move the iron sliders laterally and close the jointing irons on books in the conveyor early in a jointing stroke and retract them near the end of said stroke.

6. The device of claim 5 in which the sliders are channel members with parallel legs extending downwardly and an elongated opening in a horizontal web, the cam bars are mounted between the legs of the channel members, and the gear rack means is a gear block on each cam bar extending upwardly through said elongated opening.

7. A book jointing machine comprising: a frame; conveyor means on the frame for compressing the cases of books and carrying them through the machine with their hinge areas exposed; a pair of iron sliders on the frame flanking the conveyor means, each slider being a channel member with a horizontal web and upright parallel legs; opposed jointing irons on said sliders in the plane of the hinge areas of books in the conveyor means; drive means on the frame; first power transmission means operatively connecting said drive means with said iron sliders to reciprocate the sliders longitudinally in a long, straight line jointing stroke at the same speed as the conveyor means and parallel to the books in said means, and in a return stroke; a pair of cam rails, one of which is slidably mounted between the legs of each slider; second power transmission means for reciprocating said cam rails to move the iron sliders a short distance laterally and close the jointing irons on books in the conveyor early in a jointing stroke and retract them out of contact with the books near the end of said stroke.

8. The device of claim 7 in which the power transmission means and the rails cooperate to reciprocate the rails longitudinally, and cooperating cam means on the frame and on said rails cause lateral motion of the rails.

9. A book jointing machine comprising: a frame; conveyor means on the frame for compressing the cases of books and carrying them through the machine with their spines uppermost and their hinge areas above the conveyor means; a pair of iron sliders on the frame flanking the conveyor means; a long gear rack on each slider; opposed jointing irons on said sliders in the plane of the hinge areas of books in the conveyor means; a pair of cam rails, one of said rails slidably engaging each slider; a short gear rack block on each cam rail; iron drive and control means mounted on a platform at one side of the frame, said means including first cam means to drive the sliders and second cam means to drive the cam rails; a first shaft extending across the frame and having a pair of pinions engaging the long racks on the sliders; a second shaft extending across the frame and having a pair of gears engaging the short gear rack blocks on the cam rails; an operative connection between the first cam means and the first shaft to rotate the shaft alternately in opposite directions and thereby reciprocate the sliders longitudinally in a jointing stroke at the same speed as the conveyor means and parallel to books in said means, and in a return stroke; a driving connection between the second cam means and the second shaft to rotate said shaft in one direction early in a jointing stroke and in the opposite direction toward the end of said stroke to reciprocate the cam rails longitudinally; and cooperating means on the frame and on said rails which causes the rails to converge when the second shaft rotates in said one direction and retract when said shaft rotates in the opposite direction, whereby the jointing irons close on books in the conveyor early in a jointing stroke and retract toward the end of said stroke.

10. A book jointing machine comprising: a frame; conveyor means on the frame for compressing the cases of books and carrying them through the machine with their hinge areas exposed; a pair of iron sliders on the frame flanking the conveyor means; a plurality of iron carrier members on each slider; a plurality of iron supporting pins slidably mounted in each carrier member for movement normal to the plane of books in the conveyor; spring means urging said pins toward books in the conveyor, a separate jointing iron supported on the pins in each carrier member in the plane of the hinge areas of books in the conveyor means; drive means on the frame; and cam means which is driven by said drive means and operatively connected with said sliders to move the jointing irons longitudinally in a jointing stroke at the same speed as the conveyor means, and in a return stroke, and to close the irons on books in the conveyor means early in the jointing stroke and retract them near the end of said stroke.

11. The device of claim 10 in which the spring means comprises a leaf spring engaged with each pin, and screws are provided to adjust the tension of said springs.

12. The device of claim 10 in which the carrier members are recessed, a spring support is mounted in said recess on a pivot in a plane perpendicular to the supporting pin, the spring means for each pin is carried on said spring support; and screws means in the carrier member bears against the spring support to adjust the tension of the spring.

13. A book jointing machine comprising: a frame; conveyor means on the frame for compressing the cases of books and carrying them through the machine with their hinge areas exposed; a pair of iron sliders on the frame flanking the conveyor means; opposed jointing irons on said sliders in the plane of the hinge areas of books in the conveyor means; drive means on the frame; cam means which is driven by said drive means and operatively connected with said sliders to move the jointing irons longitudinally in a jointing stroke at the same speed as the conveyor means, and in a return stroke at a substantially higher speed; means to close the jointing irons on books in the conveyor early in the jointing stroke and retract them near the end of said stroke; a shock absorber arm connected to both sliders; and shock absorber means mounted on the frame and operatively associated with said arm to snub the sliders at the ends of both strokes, said means including a booster to increase the snubbing action on the return stroke.

14. The device of claim 13 in which the shock absorber means includes a two way fluid cylinder and piston with a piston rod extending longitudinally of the frame, the shock absorber arm acts against said rod to snub the sliders at the ends of both strokes, and means are provided to reverse the fluid bleed from the cylinder at the completion of each stroke.

15. The device of claim 14 in which the booster is a compression spring against which the shock absorber arm operates at the end of the return stroke.

References Cited in the file of this patent

UNITED STATES PATENTS

| | | |
|---|---|---|
| 1,248,252 | Bredenberg | Nov. 27, 1917 |
| 2,635,776 | Cook et al. | Apr. 21, 1953 |
| 2,725,156 | Manas | Nov. 29, 1955 |
| 2,853,725 | Schoenberger | Sept. 30, 1958 |